2 Sheets--Sheet 1.

A. COOKE & D. W. CROSS.
Corn-Row Markers.

No. 139,546. Patented June 3, 1873.

Witnesses
Phil. R. Larner
G. F. Stenz

Inventors.
Adolphus Cooke and
David W. Cross,
By Wm. Elwood
Attorney

2 Sheets--Sheet 2.

A. COOKE & D. W. CROSS.
Corn-Row Markers.

No. 139,546. Patented June 3, 1873.

Witnesses.
Phil. A. Garner
G. F. Stenz

Inventors.
Adolphus Cooke and
David W. Cross,
By McShord
Attorney

AM. PHOTO-LITHOGRAPHIC CO. N.Y. (OSBORNE'S PROCESS.)

UNITED STATES PATENT OFFICE.

ADOLPHUS COOKE AND DAVID W. CROSS, OF BROOKLANDVILLE, MD.

IMPROVEMENT IN CORN-ROW MARKERS.

Specification forming part of Letters Patent No. 139,516, dated June 3, 1873; application filed April 21, 1873.

*To all whom it may concern:*

Be it known that we, ADOLPHUS COOKE and DAVID W. CROSS, both of Brooklandville, in the county of Baltimore and State of Maryland, have invented certain new and useful Improvements in Corn-Row Markers.

Our invention consists in combining on a wheeled carriage one or more interior markers, which are arranged at row-space distance from the wheels, and exterior markers, which are arranged to operate simultaneously with the interior ones, and alternately operate in the track of the wheels with a lifting-bar, which is common to all of the markers, whereby the wheels of the vehicle may be alternately employed as the guide base or gage from which the several markers will operate to secure parallel and accurately-spaced rows without operating either marker twice on the same line, and so that the operator will be enabled to simultaneously control all of the markers; and, further, in the novel means employed for controlling the several markers; and we do hereby declare that the following specification, taken in connection with the drawings furnished and forming a part of the same, is a clear and accurate description of machines embodying the several features of our invention.

Figure 1:
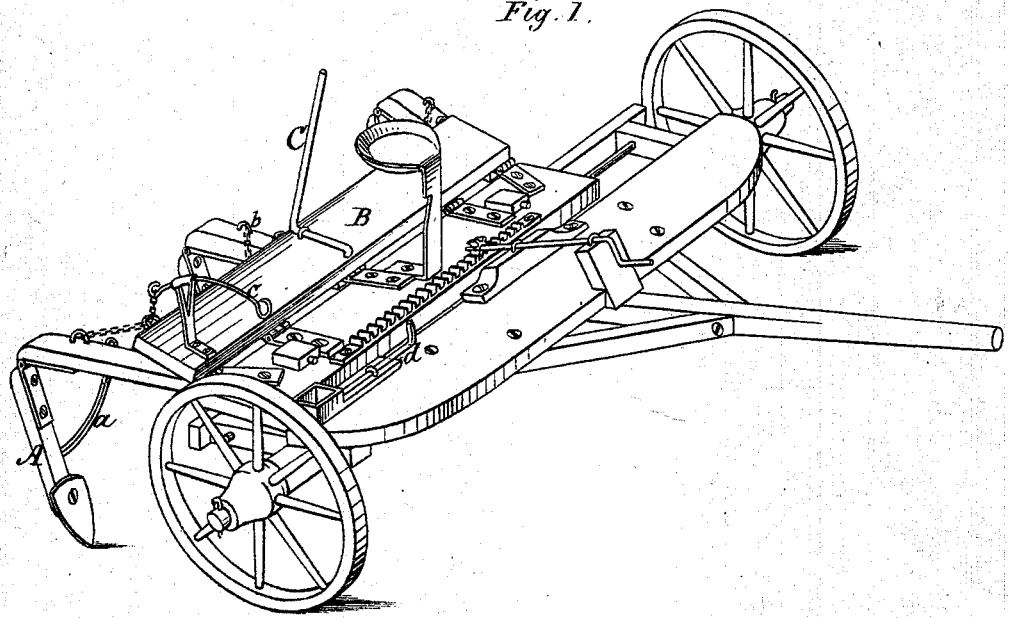
Figure 2:
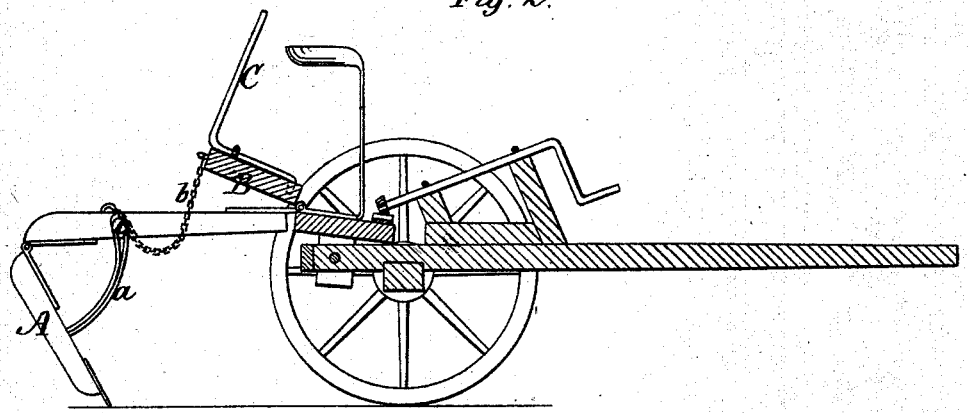
Figure 3:
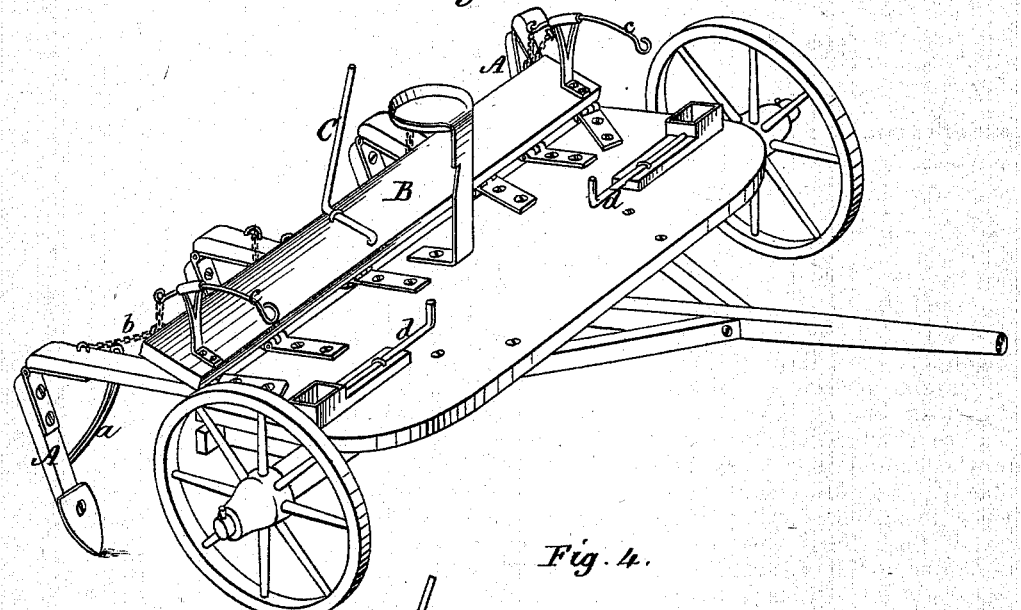
Figure 4:
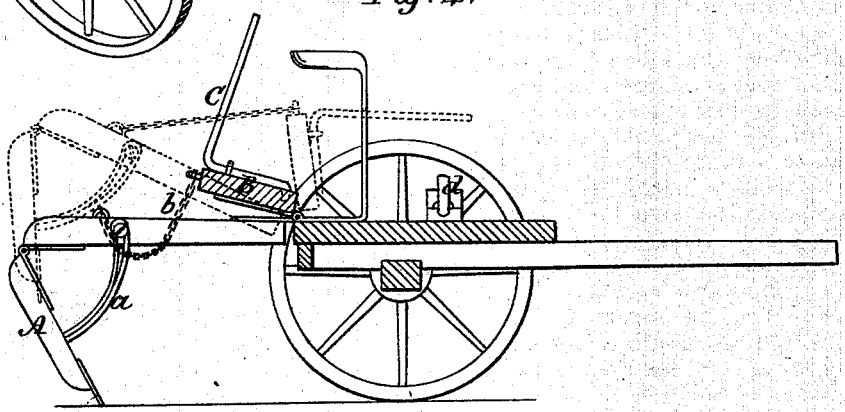
Figure 5:
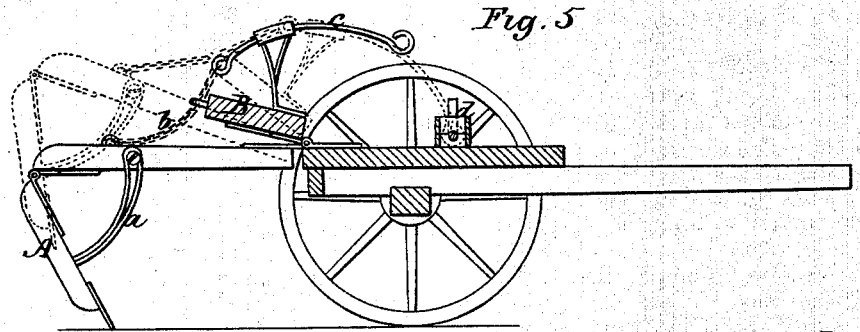

Referring to the drawings, of which two sheets are presented, Figure 1 represents in perspective a three-row marker embodying our invention. Fig. 2 represents the same in longitudinal vertical section on a line with the draft-pole. Fig. 3 represents in perspective a three-row marker, provided with four spades, which embodies the main feature and several of the minor features of our invention. Fig. 4 represents the same in longitudinal vertical section on a line adjacent to the draft-pole. Fig. 5 represents the same in longitudinal vertical section on a line parallel with one of the outside markers.

It is a well-known fact that few persons have the faculty of determining relative distances at sight, and that where the eye alone is depended upon for guiding a row-marker the results generally attained are far from satisfactory. To remedy this, various means have been heretofore devised, inclusive of sliding chain-carrying bars, swinging arms, and in some cases the wheels themselves have been employed as the marking mediums.

Rows four-feet apart are generally deemed desirable for corn; and, in practice, we have found that a three-row marker can be successfully and profitably employed.

A denotes, in each instance in all the figures of the drawing, a marking-spade of the usual form. Each marker is secured to a jointed arm, which is hinged or pivoted to the frame of the machine. The lower joint of the arm is secured to the upper portion by a slotted segment-bar, a, and a set-nut, whereby the spade may be set at any desired inclination. B denotes a lifting-bar, which is hinged at its lower edge to the frame of the apparatus, and to its upper edge each spade-arm is connected by a chain, b, which is secured to the arm near the elbow. When the lifting-bar inclines backward the several spades are in contact with the ground and ready for operation. When it is inclined forward the several markers are simultaneously elevated. A lever, C, is secured to the upper edge of the lifting-bar B adjacent to the driver's seat, and is so arranged that the driver may with his foot depress the lever, and secure it in that position by placing it under a projecting shoulder, with which it can engage.

In order that the main feature of our invention may be made available, it is essential that the distance from each wheel to a centrally-located marker shall be equal to the space between the rows to be made—as, for instance, in a two-row marker one of the spades must be located equidistant between the wheels; and if the rows are to be four feet in width the axle from bearing to bearing will be, say, about eight feet, or at least that distance from felly to felly. In a three-row marker two central markers are employed, and the distance from each of these to the wheel next adjacent will be four feet, and the markers will be four feet apart, requiring, therefore, an axle on which the wheels may be twelve feet apart.

As before stated, it is believed that a set of spades capable of marking three rows is the maximum number which can profitably be employed; and we have presented in the drawings a three-row marker having but three spades, and a three-row marker, which embodies as fully the main features and some of the minor features of our invention, in which four spades are employed, although but three of them can really be simultaneously operated.

In Figure 1, the lifting-bar B is mounted on a frame which is fitted so as to slide four feet to and fro on the carriage between the wheels, and this of course will cause the several markers, also attached to the frame and the bar, to move with them. By this means it will readily be seen that the outer of the three markers can be made at will to follow in the track of the wheel on either side. Various means may be employed for moving the frame, as, for instance, the crank, pinion, and rack-gear shown in the drawing, although the slide may as well be moved by hand and secured in position by a pin and matched holes in the sliding frame, and the main frame of the apparatus. In Fig. 3 no sliding frame is needed, for four spades are employed instead of three, and the two outer markers are arranged to follow exactly in the track of the wheels. As in Fig. 1, they are mounted four feet apart, but are hinged direct to the main frame of the apparatus, and are, as in that figure, controlled in the same manner by the lifting-bar B and foot-lever.

It will be readily comprehended that so long as the interior markers are distant the width or space required between the rows from the wheel next adjacent, if the wheel be made by the driver to follow in one of the rows already made, all the markers will be operated at proper space therefrom and parallel therewith. As, for instance, in operating the machine with the three markers on the sliding frame, it will be presumed that a lot is to be laid off—the driver sets the markers toward the left hand with the outer one behind the left hand wheel, and starts with the right hand wheel on the unplowed ground, or next to a fence or hedge. As he progresses down the field special care will be taken to drive as near straight as the eye will guide, and on arriving at the end of the field the driver will, with his foot, raise the markers and turn the machine, locating the left hand wheel in the outer line of the three rows just marked. He will then slide the frame and the markers until the outside one on the right will be in the rear of the right-hand wheel, and the outside one on the left will be four feet from the left-hand wheel, after which the markers will be dropped and the return trip made with the left-hand wheel following in the outer row last made until the starting-point has been gained, when the adjustment of the markers will be reversed, and so on.

It will readily be seen that the real value of our invention resides in the fact that the markers are so arranged with relation to the wheels that when either wheel is occupying a row the several markers are properly spaced therefrom as from a true base-line, and that neither of the outside markers need be operated twice on the same line and in the same track. In three-row markers it will sometimes occur that one or even both of the outer ones may be dispensed with, while the remainder are required.

In Fig. 1 it will be seen that one of the outer markers is provided with a means for keeping it elevated, and in operative while the others are down and in action. The chain of this outer marker passes through an eyebolt in the upper edge of the lifting-bar B, and is secured to a curved rod, $c$, which is supported in bearings on a bracket which projects outward from the front side of the lifting-bar B. The rod $c$, at its outer end, may be either provided with a hook or an eye with which a sliding foot-bolt, $d$, is arranged to engage. When the markers are all in operation the rod $c$ is far from the foot-bolt $d$. When the lifting-bar is tilted forward, the rod $c$ approaches so that its eye or hook is coincident with the foot-bolt $d$, and the driver, by a movement of the foot, causes the latter to engage with the eye or hook of the rod. A similar foot-bolt operating in the opposite direction is also to be provided for controlling in the same manner the other outside marker.

It will readily be seen, when the lifting-bar is next allowed to fall back, that the outer marker will be held up although all of the rest will then be down and ready for action. The markers may be tied together at their elbows with chains or rods, or their arms may be fitted between vertical standards which will cause them to maintain their proper relative positions.

We are aware that it is not new to combine in one machine several row-markers, nor to have them so arranged that the driver may control them with his foot.

We therefore claim as new, and desire to secure by Letters Patent—

1. In a row-marker which has its outer marking devices arranged to operate in the track of the wheels, the interior marker or markers, which are arranged to operate at row-space distance from the wheels, and the exterior markers, which are arranged to alternately operate simultaneously with the interior markers, and in the track of the wheels, in combination with a lifting-bar, which is common to all the markers, substantially as described and for the purposes specified.

2. The combination, on the main frame and axle of a row-marker, of the several markers, with the sliding frame, the lifting-bar and its operative lever, substantially as described.

3. The retaining bolt $d$ arranged to engage with and retain a marker in an elevated position, in combination with the spade-lifting device, as and for the purposes specified.

ADOLPHUS COOKE.
DAVID W. CROSS.

Witnesses:
 JACKSON WYMAN,
 JNO. WRIGHT.